United States Patent [19]

Thorne

[11] Patent Number: 5,757,414
[45] Date of Patent: May 26, 1998

[54] TELEVISION RECEIVER

[75] Inventor: Nicholas D. L. Thorne, Southampton, United Kingdom

[73] Assignee: U.S. Philips Corporation, New York, N.Y.

[21] Appl. No.: 570,181

[22] Filed: Dec. 7, 1995

[30] Foreign Application Priority Data

Dec. 15, 1994 [GB] United Kingdom ............ 9425333

[51] Int. Cl.$^6$ ............ H04N 7/00; H04N 7/10
[52] U.S. Cl. ............ 348/1; 348/2; 348/10; 348/460; 348/461
[58] Field of Search ............ 348/1, 2, 10, 460, 348/461; H04N 7/00, 7/10

[56] References Cited

U.S. PATENT DOCUMENTS

| | | | |
|---|---|---|---|
| 4,697,209 | 9/1987 | Kiewit et al. | 358/84 |
| 4,893,248 | 1/1990 | Pittis et al. | 364/464.01 |
| 4,894,714 | 1/1990 | Christis | 358/86 |
| 5,033,085 | 7/1991 | Rew | 380/20 |
| 5,323,240 | 6/1994 | Amano et al. | 348/731 |
| 5,382,983 | 1/1995 | Kwoh et al. | 348/716 |
| 5,410,359 | 4/1995 | Odijk et al. | 348/468 |
| 5,532,732 | 7/1996 | Yuen et al. | 348/1 |

FOREIGN PATENT DOCUMENTS

| | | | |
|---|---|---|---|
| 4308190A1 | 9/1994 | Germany. | |
| 61-79390 | 4/1986 | Japan. | |
| 560430 | 3/1975 | Switzerland | G07C 3/00 |
| WO9510916 | 4/1995 | WIPO. | |

*Primary Examiner*—John K. Peng
*Assistant Examiner*—Vivek Srivastavn
*Attorney, Agent, or Firm*—Edward W. Goodman

[57] ABSTRACT

A television receiver includes a micro-controller (103) for control of tuning, teletext acquisition, on-screen display, and other functions. It also includes a non-volatile memory (111) in which information regarding the source from which a signal is being received is stored under the control of the micro-controller (103). The micro-controller (103) also enters start and stop times which may be acquired by the teletext acquisition circuit (102). Under control of a user using, for example, a remote control device, the micro-controller (103) reads the information from the non-volatile memory (111) and formats it into information suitable for display to the user to enable the user to monitor the programs received.

23 Claims, 4 Drawing Sheets

TELEVISION RECEIVER

BACKGROUND OF THE INVENTION

1. Field of the Invention

The invention relates to a television receiver.

2. Description of the Related Art

Current television receivers normally include a micro-controller for controlling various functions within the television set, such as program tuning, on-screen displays (OSD) and teletext acquisition and decoding. The teletext acquisition and decoding is frequently provided as a separate custom-designed integrated circuit which communicates with the micro-controller. Inputs to the micro-controller are frequently from a remote control device via an infrared communications link. Thus, typically, the user will use the remote control unit to select the particular program source which he or she desires to watch. This may be, for example, a number of broadcast television channels or a choice of channels provided by a cable television network or a satellite receiver, or from an external source such as a video cassette recorder or a video disc player. The remote control unit is also used to select a particular teletext page for display and, in some instances, may be used for additional functions which are specific to a particular television set such as freeze frame and other special effects.

SUMMARY OF THE INVENTION

It is an object of the invention to provide further user-controlled new facilities in a television receiver which incorporates a micro-controller.

The invention provides a television receiver including micro-controller, a non-volatile memory, means for detecting the time during which the television receiver is receiving and displaying a signal from a source, means for detecting the source from which the displayed signal is originated, means for storing, in the non-volatile memory, information indicating the signal source received and the duration for which it is received, means for retrieving, on command, the stored information from the non-volatile memory, and means for displaying the information in a form intelligible to the user.

By providing a facility for storing a record of the programs which have been viewed and displaying that record, it is possible for a review of that information to be provided in a form intelligible to the user. Thus, for example, a parent may monitor the viewing habits of their children.

Another possible use for such a record is in market research in order to monitor viewing figures for a particular program or for a particular television channel over a given time period, such a record may be accessed either by visiting the premises where the television set is located and accessing it by use of keys on the television set or on a remote control unit, or by connecting the television set to a communications network, for example, a telephone line, and transmitting control signals over the network to cause the information to be transmitted back to a central monitoring station where the information can be stored for later retrieval either on a display screen or in printed form.

EP-A-294 191, corresponding to U.S. Pat. No. 4,954,899, discloses a television receiver having a channel selection apparatus for automatically selecting a predetermined TV channel along with a user's habit or reception pattern for a prescribed period. This television receiver includes an input device for commanding reception control data for the channel selection, a clock device for generating a time data, a memory device for storing reception control data supplied from the input device for a predetermined period together with time data responding to the reception control data to be stored, a control device for controlling the memory device for writing reception control data and its responding time data thereto, and for reading out predetermined reception control data with time data responding to the present time, and an output device responsive to the control device for receiving the reception control data.

Thus, the television receiver disclosed in EP-A-294191 will, when it is switched on, review the channels to which the television is normally tuned at that time and on that day of the week by reviewing past records, and will tune the television set to the appropriate channel. Thus, it tunes the television set to accord with the viewing habits of the owner, but it does not, however, make available the possibility of displaying those habits in the form of a displayed or printed list of programs which have been viewed.

As the television receiver is controlled via the micro-controller, the micro-controller has a knowledge of which source the television set is tuned to at any given time. The micro-controller may not know the absolute time since it may not have a real-time clock available to it. The majority of television sets currently produced, however, include a teletext decoder, and a time signal is transmitted on row zero of every page of the teletext signal, and the micro-controller can access this time information and may use that to determine the absolute start and stop times of receiving any particular program.

There may be a number of sources where no associated teletext signal is transmitted, one example being when a video cassette recorder is connected as the input to the television receiver, where even if it were possible to record a teletext signal with the program, the teletext clock would relate to the time at which the program was recorded rather than that at which it was replayed. Under those circumstances, a real-time clock may not be available, but the micro-controller will be driven by a clock signal whose periods can be counted to determine the length of time during which a given source is being displayed. The display of the information may be arranged so that it is in chronological order, in which case, the time during which the video recorder or other program source without an associated teletext signal is connected may be indicated by the fact that it occurs between the times of two programs where a real-time clock is available.

The information displayed may be formatted in any convenient form. For example, it could be arranged as a list in chronological order of particular program sources received. This may include program titles which may be obtained from the teletext program information or from PDC signals which are broadcast by certain broadcasting authorities.

Alternatively, or in addition, the micro-controller may be programmed to disable the tuning to selected programs. Thus, for example, a user may have a PIN number which allows him or her to access the non-volatile memory via the micro-controller so that certain program sources can be barred either permanently or at certain times. This can be used, for example, to enable a parent to prevent a child accessing unsuitable programs. An additional or alternative facility which may be programmed by the user, is to program a total time limit for the viewing of the television set. For example, it may be that a parent would program a television set in a child's bedroom so that it would not operate after, say, 10 o'clock in the evening, or to program it so that the child may not watch more than, say, two and a half hours of television programs. This requires the micro-controller to be able to decode a PIN number which may be entered by means of the remote control unit to enable the particular instructions to be executed.

BRIEF DESCRIPTION OF THE DRAWINGS

Embodiments of the invention will now be described, by way of example, with reference to the accompanying drawings, in which.

DESCRIPTION OF THE PREFERRED EMBODIMENTS

Figure 1:
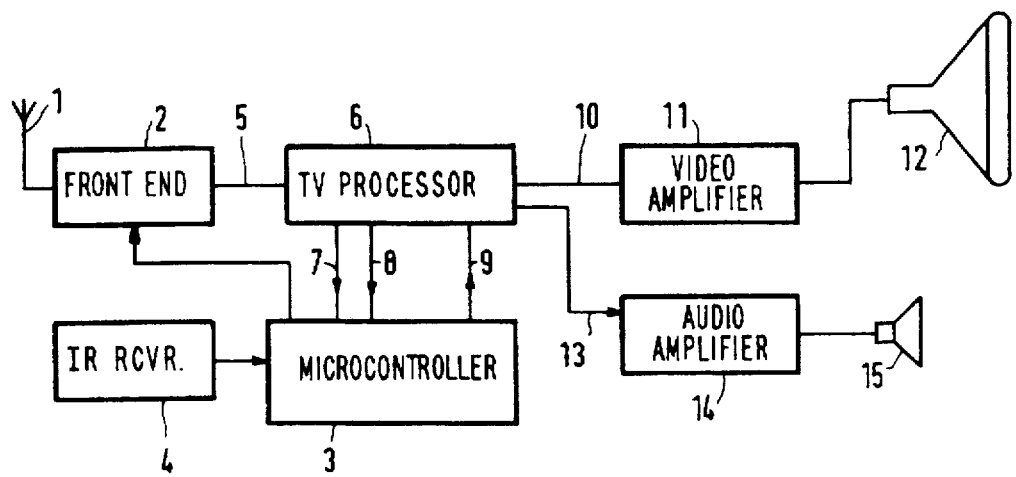
FIG. 1 shows, in a block schematic form, a television receiver according to the invention.

As shown in FIG. 1, an aerial 1 is connected to the input of the front end 2 of a television receiver, the front end performing the usual RF amplification, demodulation, and detection functions as is well known in the television art. The front end 2 operates under the control of a micro-controller circuit 3 which receives, from an infrared receiver 4, signals which represent the pressing of keys on a remote control unit (not shown). The demodulated video signal is passed over a path 5 to a T.V. processor 6. This provides the usual video signal processing to allow color decoding, the generation of synchronizing pulses, etc. A combined video and blanking signal is supplied over a line 7 to the micro-controller circuit 3, which includes a teletext acquisition circuit, as are synchronizing pulses over a line 8. These are the normal television horizontal and vertical synchronizing pulses. The micro-controller circuit 3 provides an output over a line 9 which is an RGB signal which is fed to the television processor 6. The RGB signals are fed via a line 10 from the T.V. processor 6 to video amplifiers 11 and thence to a display device 12, while audio output signals are fed via a line 13 to audio amplifiers 14 and to a loudspeaker 15.

Figure 2:
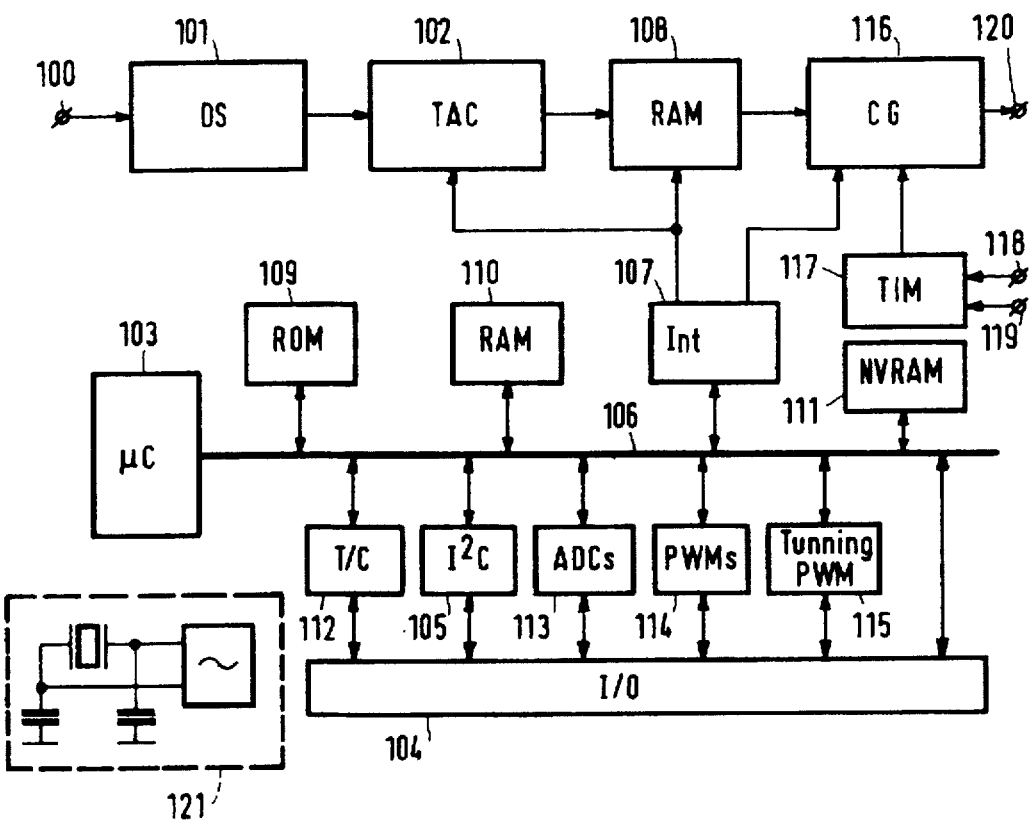
FIG. 2 shows a block diagram of the micro-controller and teletext acquisition circuits.

FIG. 2 shows, in greater detail, the micro-controller circuit 3 shown in FIG. 1. The arrangement has an input 100 which receives the combined video and blanking signal (CVBS) which is present on line 7. The input 100 is connected to a data slicer 101. The data slicer 101 feeds a teletext acquisition circuit 102 which acquires and decodes the teletext transmissions. A micro-controller 103 receives, via input/output ports 104 over an I²C Bus 105, control information from a remote control unit by means of which the viewer can select a program to be viewed and/or other facilities such as teletext and on-screen displays (OSD). The micro-controller 103 outputs instructions over a bus 106 via an interface 107 to the teletext acquisition circuit 102 which causes it to acquire a selected page in response to the input signals received from the remote control unit. A selected page is fed into a page memory 108. Also attached to the bus 106 is a read-only memory 109, a random access memory 110, a non-volatile random access memory 111, timer counter circuits 112, analog-to-digital converters 113, pulse-width modulators 114, and a tuning pulsewidth modulator 115. These are all connected to the other circuits within the television receiver through the input/output ports 104. The micro-controller 103 is also connected via the bus 106 and interface circuit 107 to the teletext page RAM 108 and to a teletext character generator 116. The character generator 116 also receives timing pulses from a display timing generator 117 which is fed via input 118 and 119 with the vertical and horizontal synchronizing pulses. The character generator 116 produces an RGB output at 120 which is fed over the line 9 to the T.V. processor for amplification and application to the display device 12. The micro-controller 103 also receives clock pulses from a clock generator 121.

Figure 3:
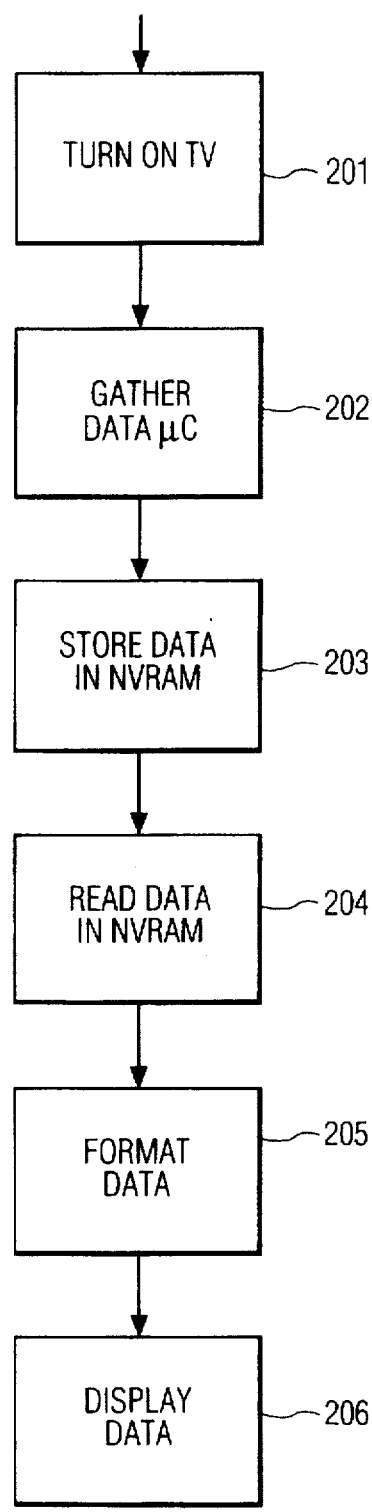
FIG. 3 is a flowchart for the display of program review data.

FIG. 3 illustrates the sequence of events to enable a display of the programs viewed by a viewer.

Block 201 represents switch on of the television receiver. Block 202 represents the gathering of data by the micro-controller. This data comprises the signal source which is to be displayed, i.e., the channel number to which the set is tuned or the connection to an auxiliary signal source, such as a video recorder, the times during which these sources are displayed. Since the micro-controller controls the tuning of the set, it will contain the data which defines which signal source is being displayed. The times at which this data changes, i.e., switch on, switch off, channel change, etc., may be determined using either internally generated clock signals or, when available, by accessing the real-time clock transmitted in teletext signals associated with the received programs. Block 203 represents the storage of this data in non-volatile RAM 111 so that this information is retained when the television set is switched off.

When the user wishes to review the programs viewed over a given period, he will request the data (Block 203) normally using a remote control unit to provide instructions to the micro-controller. The micro-controller then reads the requested data from the non-volatile RAM, Block 204, and converts it into a display format, Block 205, which may be predetermined or which may be specified by the user using the remote control device. The formatted data is then applied to the display device, Block 205.

Figure 4:
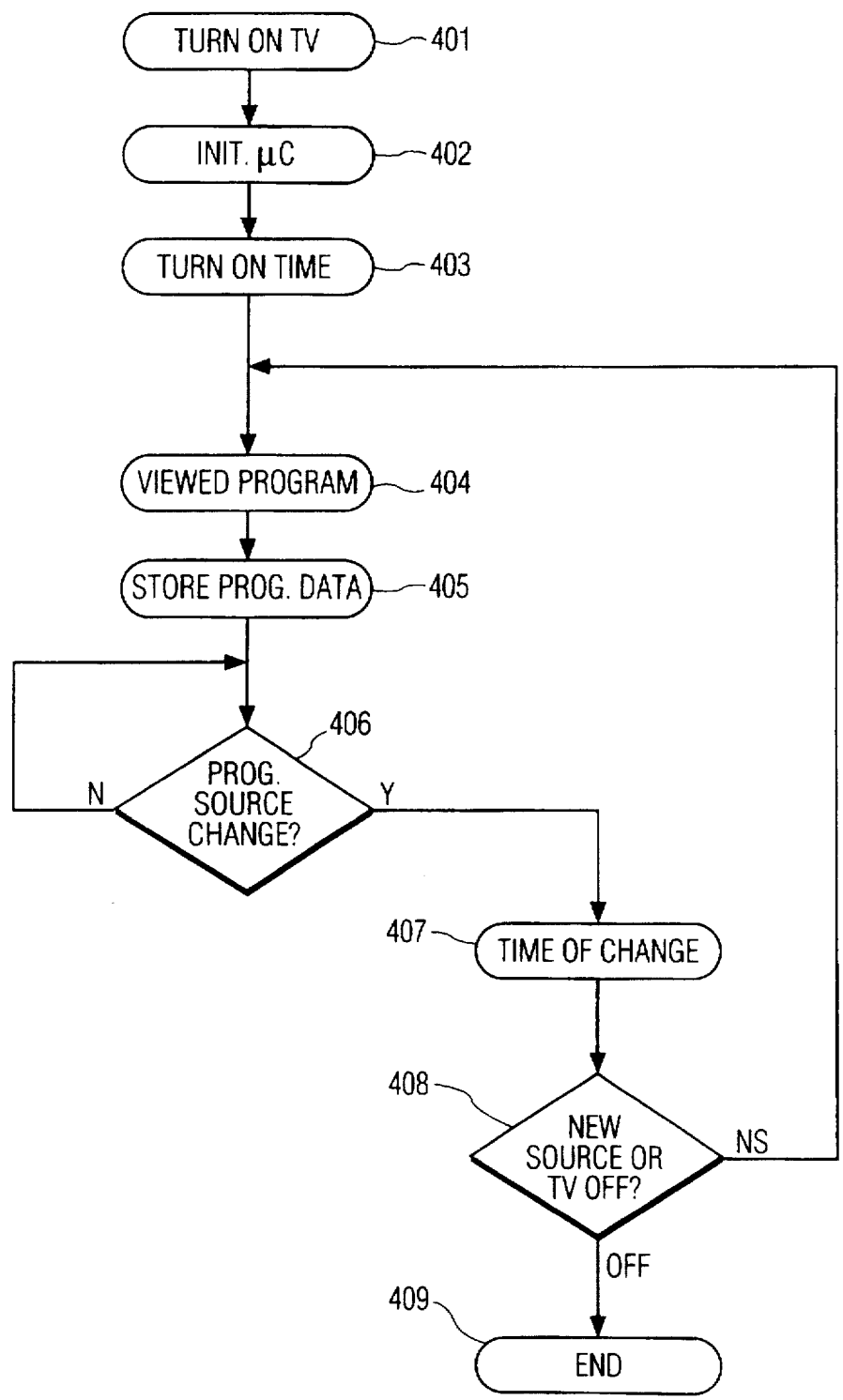
FIG. 4 is a flowchart illustrating the process by which the program information received is stored.

FIG. 4 is a flowchart showing the operation of the micro-controller as far as it is relevant to the storage of which programs which are being displayed and the time during which they are being displayed. The micro-controller will also be performing the normal control tasks to control the television receiver. The start of the routine is to switch on of the television receiver which is represented by box 401. The first process through which the micro-controller goes is to initialize its state, box 402. This is common to the whole of its control process, that is, it sets itself to an initial state which will enable control of the television set and monitoring of its operation. The next stage, represented by box 403, is to detect the time at which the receiver was switched on. This may take different forms, but in one example, it comprises the acquisition of row zero of a teletext page which contains a real-time clock. If there is no transmission of a real-time clock whether on a teletext page or otherwise, then the micro-controller may start a timer which counts the number of its clock periods. This will enable the length of time during which the receiver is operating but will not give the actual time or dates. The next stage, represented by box 404, is to detect the program being viewed. The micro-controller will, during the course of its standard control of the operation of the television set, know which program source the television set is tuned, since it controls the television tuner. Thus, it will be able to say to which channel the television set is tuned, whether from a broadcast program or from cable television. It will also know which input to the television set is active, for example, an auxiliary input to which a video recorder or video disc player may be connected. The micro-controller will then cause the start time and the program being viewed to be entered into the non-volatile memory. This is represented by box 405. The micro-controller then goes into a loop which enables it to monitor whether or not the program source is changed, box 406. If no change is detected, the micro-controller just sits in a given state monitoring whether or not a change subsequently takes place. If a change is detected, then the micro-controller stores the time at which the change is detected as the end of a particular program; this is represented by box 406. A decision is then taken, box 408, as to whether the program change is a change to a new program source or whether it is due to the television receiver being switched off. If the change is due to the television receiver being switched off then the process terminates. If the change is not due to the television receiver being switched off then the program loops back to the input of the detect time box 404.

This process depends on a delay between operating the power off button and the loss of power to the micro-controller and associated circuitry. If such a provision of power to the micro-controller after the power off button has been operated is not provided, an alternative method for ensuring the program end time is at least approximately stored, is to store an updated time periodically as the stop time, for example, every five minutes. Thus, a provisional stop time is always present in the non-volatile memory provided that the set is switched on for longer than the update period.

By this means, the start and stop times of each program received may be stored in the non-volatile memory. The period over which such information is stored will depend on the capacity of the non-volatile memory. It may, for example, be for a 24-hour period or could, with sufficient memory capacity, be stored over a longer period such as a week.

A possible refinement which will prevent children from negating the memory by quickly switching from channel to channel until all the storage locations are filled is to cause the program to be stored only if it is received for a minimum time, for example, 5 minutes. The actual time will be a compromise so that it is sufficiently long to make channel hopping merely to fill the memory unattractive, but sufficiently short that a meaningful viewing of the program is not possible without exceeding that time. Various other features may be introduced to make the filling of the memory by children more difficult, for example, it could be detected whether a program source was being selected for periods close to the maximum time before the program information would be stored, momentarily switching to another source and then switching back to the original source, by keeping a running total of the times that a particular source was selected over a period of say half an hour.

An alternative approach for parental control could be to use the non-volatile memory to bar the tuning of the television receiver to certain program sources for certain periods. Thus, if it is deemed that an unsuitable program appears on channel 1 between 8.30 and 9 o'clock in the evening, it would be possible to enter that information into the non-volatile memory using the remote control and a PIN number which is known only to the parent. The micro-controller would then monitor the contents of the non-volatile memory and inhibit tuning to that particular program for the period set. This could also inhibit other sources, such as video recorders and video disc players, from being operated between appropriately programmed times, for example, when the parents are out.

Figure 5:
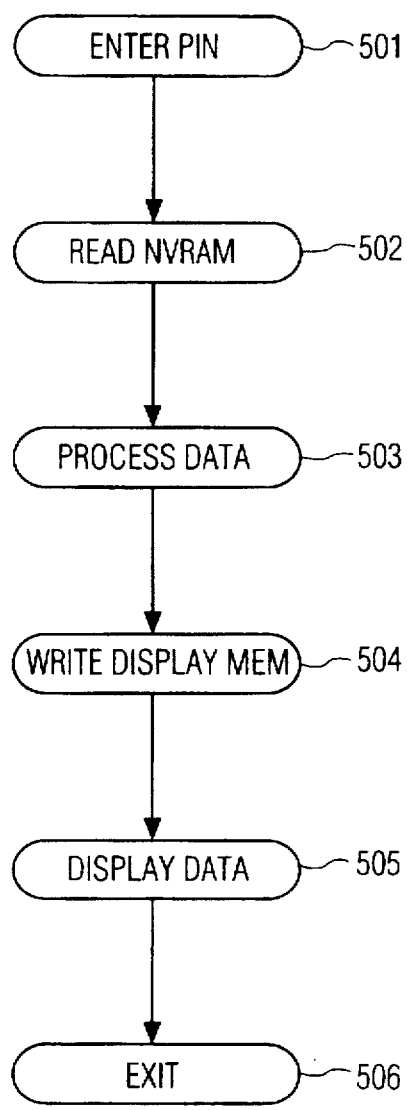
FIG. 5 is a flowchart illustrating the retrieval and display of the program information stored.

Having obtained the information and stored it in the non-volatile memory, it is then necessary to enable the viewer to review the information stored. To effect this process, the viewer uses the remote control unit to signal to the micro-controller that he/she wishes to have the information displayed. If desired, the use of a PIN number to enable the display request can be utilized so that only the parent can access this information. This is represented by box 501 in FIG. 5. The next step is for the micro-controller to read the appropriate contents of the non-volatile memory, this is represented by box 502. The micro-controller then processes the data into a form suitable for display, this is represented by box 503. The next step is to write the processed data to the display memory which enables the character generator to generate the display information, this is represented by box 504. The micro-controller then causes the output of the character generator to be applied to the video amplifiers, represented by box 505, and completes the process which ends, box 506.

The display data can be formatted in any convenient form, for example, it may be just a chronological list of the source that the television set was tuned to and the times for which it was tuned to that particular source. Other ways of displaying the data are possible depending on how the micro-controller is programmed to process it. For example, the display could merely indicate the number of hours for which the television set has been switched on during a given period, for example, the last 24 hours. It could merely give an indication, for example, by means of bar charts, as to how long each particular source was received regardless of the particular times during which the source was active, for example, it may indicate that channel 1 was received for two hours, channel 2 for half an hour, channel 3 for six hours, etc. Another indication may be merely that the set was switched on between certain hours. Exactly what information is displayed is dependent on how the micro-controller is programmed to process the information stored in the non-volatile memory and the way in which the micro processor is programmed to detect and store the information originally.

Various other modifications are possible within the scope of the present invention, for example, instead of using the real-time clock transmitted by the teletext signal, it is possible to incorporate a clock within the television receiver which is battery powered when the receiver is switched off and which the micro-controller may access. In this way, it is not reliant on the source of the signal for absolute time information.

From reading the present disclosure, other modifications will be apparent to persons skilled in the art. Such modifications may involve other features which are already known in the design and use of television receivers and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalization of one or more of those features which would be obvious to persons skilled in the art, where or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

We claim:

1. A television receiver including:
   a micro-controller;
   a non-volatile memory;
   means for detecting the time during which the television receiver is receiving and displaying a signal from a source;
   means for detecting the source from which the displayed signal is originated;
   means for storing, in the non-volatile memory, information indicating the source from which the signal is received and the duration for which it is received;
   means for retrieving, on command, the stored information from the non-volatile memory; and
   means for displaying, in a form intelligible to the viewer, the source from which a displayed signal originates and the duration of the display of the signal from that source.

2. A television receiver as claimed in claim 1, characterized in that the television receiver further comprises a teletext decoder, wherein the time detecting means comprises means for monitoring a teletext real-time clock contained in row zero of a teletext page.

3. A television receiver as claimed in claim 1, in which the time detecting means comprises counting means for counting clock cycles of a micro-controller clock signal for the time during which a signal from a given source is received.

4. A television receiver as claimed in claim 2, in which the time determining means comprises counting means for counting clock cycles of a micro-controller clock signal for the time during which a signal from a given source is received.

5. A television receiver as claimed in claim 1, characterized in that said television receiver further comprises a remote control unit for remotely controlling the television receiver, said remote control being used by a user when the information display is desired.

6. A television receiver as claimed in claim 2, characterized in that said television receiver further comprises a remote control unit for remotely controlling the television receiver, said remote control unit being used by a user when the information display is desired.

7. A television receiver as claimed in claim 3, characterized in that said television receiver further comprises a remote control unit for remotely controlling said television receiver, the remote control unit being used by a user when the information display is desired.

8. A television receiver as claimed in claim 4, characterized in that said television receiver further comprises a remote control unit for remotely controlling said television receiver, the remote control unit being used by a user when the information display is desired.

9. A television receiver as claimed in claim 1, characterized in that said television receiver further comprises means for inhibiting or deleting storage of a program source and time information if the program source is received for less than a first given period.

10. A television receiver as claimed in claim 2, characterized in that said television receiver further comprises means for inhibiting or deleting storage of a program source and time information if the program source is received for less than a first given period.

11. A television receiver as claimed in claim 3, characterized in that said television receiver further comprises means for inhibiting or deleting storage of a program source and time information if the program source is received for less than a first given period.

12. A television receiver as claimed in claim 5, characterized in that said television receiver further comprises means for inhibiting or deleting storage of a program source and time information if the program source is received for less than a first given period.

13. A television receiver as claimed in claim 9, characterized in that said television receiver further comprises means for storing program source and time information if a signal from the same source is received more than once within a second given period longer than said first given period if the total time during which a signal from that source is received within said second given period, exceeds the first given period.

14. A television receiver as claimed in claim 10, characterized in that said television receiver further comprises means for storing program source and time information if a signal from the same source is received more than once within a second given period longer than said first given period if the total time during which a signal from that source is received within said second given period, exceeds the first given period.

15. A television receiver as claimed in claim 11, characterized in that said television receiver further comprises means for storing program source and time information if a signal from the same source is received more than once within a second given period longer than said first given period if the total time during which a signal from that source is received within said second given period, exceeds the first given period.

16. A television receiver as claimed in claim 12, characterized in that said television receiver further comprises means for storing program source and time information if a signal from the same source is received more than once within a second given period longer than said first given period if the total time during which a signal from that source is received within said second given period, exceeds the first given period.

17. A television receiver as claimed in claim 1, characterized in that said television receiver further comprises means for entering program source and time information into the non-volatile memory; and means for inhibiting the reception a signal from the source during a time period when the source and time period are represented by the information entered into the non-volatile memory.

18. A television receiver as claimed in claim 17, characterized in that said television receiver further comprises:
   means for detecting entry of a personal identification number (PIN); and
   means for inhibiting entry or alteration of the information in the non-volatile memory until entry of said PIN is detected, the micro-controller being arranged to allow alteration of the information only if the PIN has been received.

19. A television receiver as claimed in claim 2, characterized in that said television receiver further comprises means for entering program source and time information into the non-volatile memory, and means for inhibiting reception of a signal from the program source during a time period when the program source and time period are represented by the information entered into the non-volatile memory.

20. A television receiver as claimed in claim 19, characterized in that said television receiver further comprises:
   means for detecting entry of a personal identification number (PIN); and
   mean for inhibiting entry or alteration of the information in the non-volatile memory until entry of said PIN is detected, the micro-controller being arranged to allow alteration of the information only if the PIN has been received.

21. A television receiver as claimed in claim 2, wherein said time detecting means detects the start and stop times of a program source, the information being stored in said non-volatile memory is said start and stop times for viewing each source, and the intelligible form of displaying comprises displaying a list of the stored sources and the start and stop times for each source.

22. A television receiver as claimed in claim 21, wherein said time detecting means further comprises a real-time clock incorporated in said television receiver, and the list is displayed in chronological order with those sources having an associated teletext transmission being displayed together with start and stop times derived from the teletext real-time clock and those sources having no associated teletext transmission being displayed together with start and stop times derived from said television real-time clock.

23. A television receiver as claimed in claim 21, wherein the list is displayed in chronological order with those sources having an associated teletext transmission being displayed together with start and stop times derived from the teletext real-time clock and those sources having no associated teletext transmission being displayed with a duration time only.

* * * * *